United States Patent
Seo

(10) Patent No.: US 8,330,897 B2
(45) Date of Patent: Dec. 11, 2012

(54) BACKLIGHT UNIT AND LIQUID CRYSTAL DISPLAY DEVICE HAVING THE SAME

(75) Inventor: Jeong-Min Seo, Cheonan (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1302 days.

(21) Appl. No.: 12/024,838

(22) Filed: Feb. 1, 2008

(65) Prior Publication Data

US 2008/0186430 A1  Aug. 7, 2008

(30) Foreign Application Priority Data

Feb. 1, 2007 (KR) .......................... 10-2007-0010548

(51) Int. Cl.
*G02F 1/1335* (2006.01)
*F21V 7/04* (2006.01)

(52) U.S. Cl. .......................................... 349/65; 362/632

(58) Field of Classification Search .................... 349/65; 362/632
See application file for complete search history.

(56) References Cited

U.S. PATENT DOCUMENTS
2006/0001793 A1 * 1/2006 Nitto et al. ....................... 349/58

FOREIGN PATENT DOCUMENTS
| JP | 2005024744 | 1/2005 |
| JP | 2005158707 | 6/2005 |
| KR | 1020020029709 | 4/2002 |

* cited by examiner

*Primary Examiner* — Jerry Blevins
(74) *Attorney, Agent, or Firm* — F. Chau & Associates, LLC

(57) ABSTRACT

A backlight unit includes an optical sheet, a receiving member configured to receive the optical sheet, the receiving member having a support surface supporting the optical sheet, an extension configured to protrude from a side surface of the optical sheet, an inner surface position defining portion configured to define a location of the optical sheet, the inner surface position defining portion being substantially perpendicular to the support surface of the receiving member and facing an inner surface of the extension, and an outer surface position defining portion substantially perpendicular to the supporting surface of the receiving member and facing an outer surface of the extension, wherein a first distance between the inner surface position defining portion and the inner surface of the extension is less than a second distance between the outer surface position defining portion and the outer surface of the extension.

19 Claims, 6 Drawing Sheets

BACKLIGHT UNIT AND LIQUID CRYSTAL DISPLAY DEVICE HAVING THE SAME

CROSS-REFERENCE TO RELATED APPLICATION

This application claims priority to and the benefit of Korean Patent Application No. 10-2007-0010548 filed on Feb. 1, 2007, the entire contents of which are incorporated herein by reference.

BACKGROUND OF THE INVENTION

1. Technical Field

The present invention relates to a backlight unit and a liquid crystal display having the same, and more particularly, to a backlight unit and a liquid crystal display device having the same capable of precisely defining a location of an optical sheet and preventing deformation of the sheet.

2. Discussion of the Related Art

A backlight unit is an element of a liquid crystal display ("LCD") device that irradiates light at a rear surface of an LCD panel mounted in an LCD monitor, a personal computer, a navigation system for a vehicle, and the like. The LCD device displays various images and information. The LCD device uses a backlight unit for supplying light to the LCD panel because the LCD device is a passive display that does not emit light by itself.

The backlight unit includes a receiving member, a light source, a light guide plate, and a plurality of optical sheets. The receiving member receives the light guide plate and the optical sheets that include, for example, a reflection sheet, a diffusion sheet, a prism sheet, and a protection sheet.

The optical sheets deliver uniform light to the LCD panel. Therefore, a location where the optical sheets are initially mounted within the backlight unit preferably remains unchanged. An optical property is affected by the distance between the optical sheets and light guide plate.

Heat is generated from the light source during an operation of the backlight unit, thereby increasing the temperature of the backlight unit. Thin optical sheets experience changes in length by heat expansion. If the frame is not capable of accommodating for such changes in length, the optical sheets deform within the backlight unit. Such deformation may result in a change in distance between the optical sheet and light guide plate, thereby causing a display failure of the LCD device.

Tightly securing the optical sheets within the backlight unit to prevent the movement of the optical sheets can compromise the ability to maintain a sufficient distance between the optical sheets and the frame to sufficiently accept heat expansion of the optical sheets. As a result a way of preventing movement of the optical sheets while also maintaining sufficient distance between the optical sheets and the frame is required.

SUMMARY OF THE INVENTION

Embodiments of the present invention provide a backlight unit and an LCD device having the same, capable of obtaining a sufficient distance to bear deformation of the optical sheet by its expansion and tightly securing the optical sheet by tightly contacting an inner side of the optical sheet.

An exemplary embodiment of the present invention provides a backlight unit including an optical sheet, a receiving member configured to receive the optical sheet, the receiving member having a supporting surface supporting the optical sheet, an extension protruding from a side surface of the optical sheet, an inner surface position defining portion configured to define a location of the optical sheet, the inner surface position defining portions being substantially perpendicular to the supporting surface of the receiving member and facing an inner surface of the extension, and an outer surface position defining portion substantially perpendicular to the supporting surface of the receiving member and facing an outer surface of the extension, wherein a first distance between the inner surface position defining portion and the inner surface of the extension is less than a second distance between the outer surface position defining portion and the outer surface of the extension.

A ratio of the first distance between the inner surface of the extension and the inner surface position defining portion to the second distance between the outer surface of the extension and the outer surface position defining portion ranges from 1:3 to 1:6, and can be 1:5.

At least one other extension may be formed to protrude from another side surface of the optical sheet.

The extensions can be formed at opposing sides of the optical sheet, respectively.

The inner surface position defining portion is a fastening protrusion portion configured to protrude upwardly from an edge area of a side of the receiving member and to fasten the extension. An outer surface of the fastening protrusion portion comes in tight contact with the inner surface of the extension.

The optical sheet comprises at least one of a diffusion sheet, a prism sheet, a protection sheet, and a reflection sheet.

The receiving member comprises at least one of a mold frame and a bottom chassis.

An exemplary embodiment of the present invention provides an LCD device including an LCD panel configured to display an image, and a backlight unit configured to supply light to the LCD panel, wherein the backlight unit comprises an optical sheet, a receiving member configured to receive the optical sheet, the receiving member having a supporting surface supporting a bottom surface of the optical sheet and a sidewall bordering a side surface of the optical sheet, a first extension protruding from an edge area of the optical sheet in a first direction, a second extension protruding from an edge area of the optical sheet in a second direction different from the first direction, first and second inner surface position defining portions substantially perpendicular to the supporting surface of the receiving member and facing an inner surface of the first and second extensions, respectively, and first and second outer surface position defining portions substantially perpendicular to the supporting surface of the receiving member and facing an outer surface of the first and second extensions, respectively.

BRIEF DESCRIPTION OF THE DRAWINGS

Exemplary embodiments of the present invention will be understood in more detail from the following description taken in conjunction with the accompanying drawings, wherein.

DETAILED DESCRIPTION OF EMBODIMENTS

Exemplary embodiments of the present invention will now be described with reference to the attached drawings. This invention may, however, be embodied in many different forms and should not be construed as limited to the embodiments set forth herein.

Figure 1:
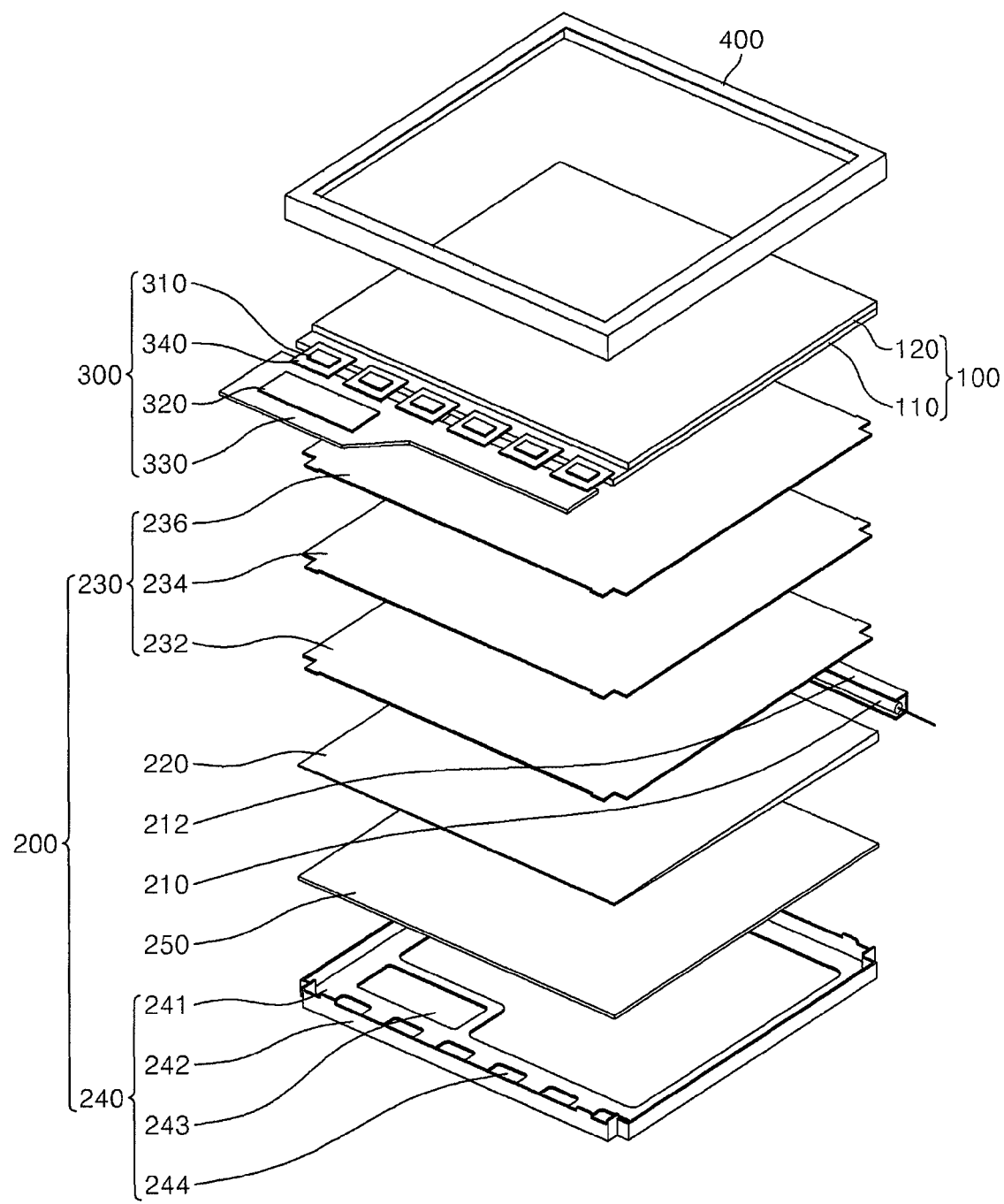
FIG. 1 is an exploded perspective view of an LCD device in accordance with an exemplary embodiment of the present invention.

FIG. 1 is an exploded perspective view of an LCD device in accordance with an embodiment of the present invention.

As shown in FIG. 1, an LCD device according to an embodiment of the present invention includes an LCD panel 100, which receives an image signal and displays an image, a backlight unit 200, which supplies light to the LCD panel 100, and a driving portion 300 having a circuit for driving the LCD panel 100.

The LCD panel 100 comprises a thin film transistor (TFT) substrate 110 and a color filter substrate 120. The TFT substrate 110 and the color filter substrate 120 are arranged to be opposite to each other and spaced apart by a constant distance. Liquid crystals are injected between the TFT substrate 110 and the color filter substrate 120.

The color filter substrate 120 has a black matrix, a color filter, a common electrode, and an alignment layer formed on a transparent insulating substrate made of, for example, glass or plastic.

The black matrix defines sub-pixels and prevents light leakage between sub-pixels. The color filter that displays a color is provided for each sub-pixel. Alternatively, the color filter may be formed on the TFT substrate. Such an LCD panel is called a COA (Color filter On Array) panel.

Further, the common electrode induces an electric field along with a pixel electrode formed on the TFT substrate, and the liquid crystal is driven by the electric field. Alternatively, the common electrode may be patterned on the color filter substrate to have, for example, a constant shape, depending upon a liquid crystal mode.

An overcoat layer formed of an organic material is further formed between the color filter and the common electrode. An alignment layer can be formed on the color filter substrate to align the liquid crystal in a constant direction. The alignment layer may be aligned in a horizontal direction or in a vertical direction, and alternatively, may be omitted.

A polarization plate may be adhered to a top surface of the color filter substrate. The polarization plate polarizes light in a specific direction. A phase difference film may be further adhered to the polarization plate.

The TFT substrate 110 includes gate lines, data lines, TFTs, pixel electrodes, and an alignment layer formed on a transparent insulating substrate made of glass or plastic.

The gate lines and the data lines intersect each other on the insulating substrate. A red sub-pixel, a green sub-pixel, and a blue sub-pixel are arranged in a row and constitute a pixel.

A gate line delivers a scan signal to a gate electrode of a TFT, and a data line delivers a data signal to a source electrode of the TFT. Further, the TFT is formed at the intersection of the gate line and the data line and functions as a switching element. The TFT comprises a gate electrode, a semiconductor layer, and source and drain electrodes.

The pixel electrode is connected to the drain electrode and induces an electric field along with the common electrode of the color filter substrate. The pixel electrode is a transparent electrode, which transmits light, and may be patterned in a constant shape. The alignment layer is formed on an upper portion, for example, the uppermost portion, of the TFT substrate and aligns the liquid crystal in a constant direction.

A polarization plate may be adhered to the bottom surface of the TFT substrate. The polarization plate may be positioned on the TFT substrate to be perpendicular to a polarization axis thereof. Alternatively, the polarization plate may be positioned parallel to a polarization axis thereof.

Liquid crystals are injected between the TFT substrate and the color filter substrate. Various modes of the liquid crystal may be used, such as a TN (Twisted Nematic) mode, a VA (Vertical Alignment) mode, and the like, which has an optical and electromagnetic anisotropic property.

The driving portion 300 is connected to a side of the TFT substrate 110 and supplies a driving signal to the gate line and the data line. Accordingly, the driving portion 300 comprises a gate driving IC (Integrated Circuit) (not shown), a data driving IC 310, a power supply (not shown), and a timing controller 320.

The gate driving IC is mounted in a gate tape carrier package (TCP) with a film shape and electrically connected with the LCD panel by a TCP bonding process. Alternatively, the gate driving IC may be directly integrated on the TFT substrate 110. The data driving IC 310 is mounted in a data TCP 340 with a film shape and electrically connected to the LCD panel 100 by a TCP bonding process.

The timing controller 320, which is mounted on a printed circuit board 330, processes externally supplied signals, generates a timing signal, and supplies the timing signal to the gate driving IC and the data driving IC 310. Accordingly, the gate driving IC supplies the timing signal from the timing controller 320 and a power source signal from the power source portion to the gate line. Further, the data driving IC 310 supplies the timing signal from the timing controller 320, an image signal, and a power source signal through a signal line formed in the data TCP 340 to the data line.

The power supply supplies the power source signal to the gate driving IC and the data driving IC 310.

Figure 2:
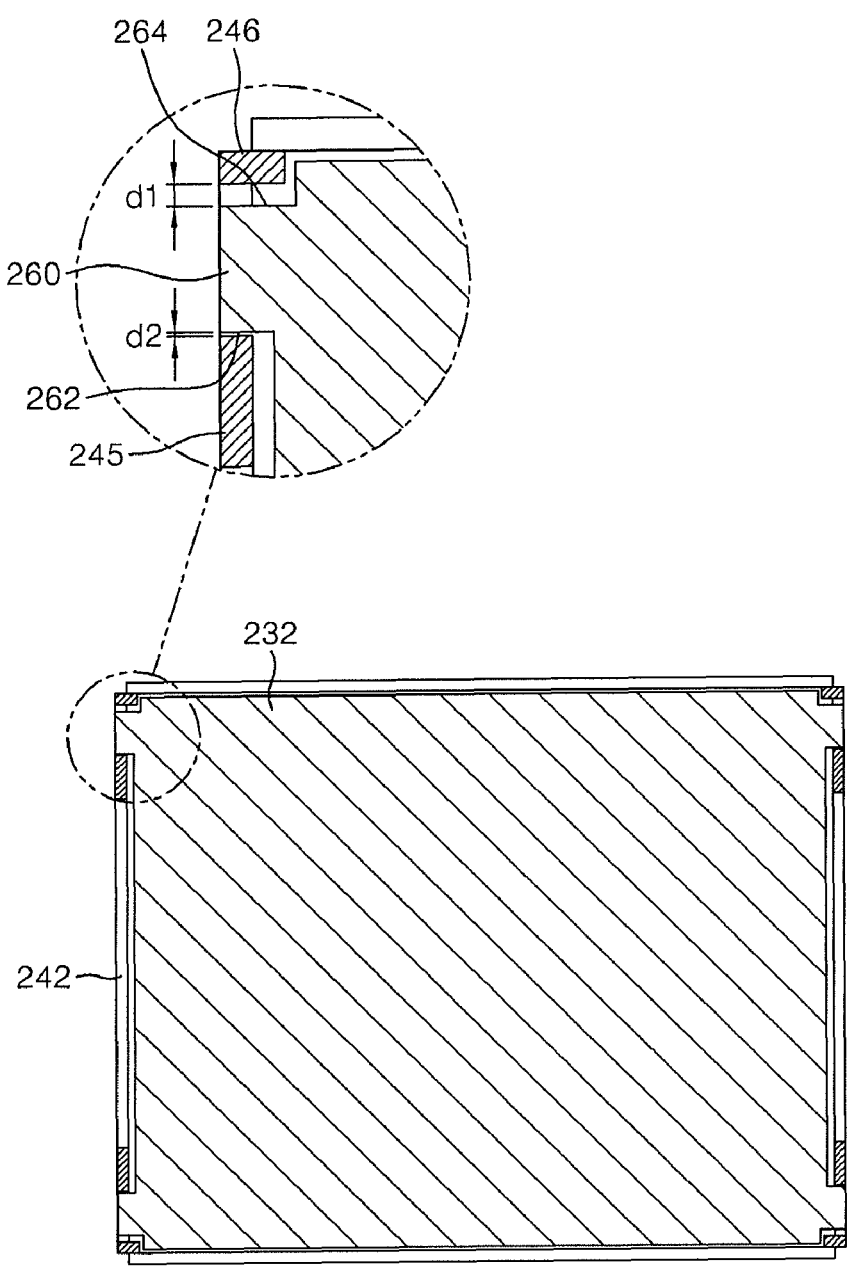
FIG. 2 is a plan view of an optical sheet and a receiving member in accordance with an exemplary embodiment of the present invention.

As shown in FIGS. 1 and 2, the backlight unit 200 according to an embodiment of the present invention includes a light source 210, a light guide plate 220, optical sheets 230, and a mold frame 240.

The light source 210 that emits light may use, for example, a cold cathode fluorescent lamp (CCFL), an external electrode fluorescent lamp (EEFL), or a light emitting diode (LED). Although a side emitting type of the light source 210, which is mounted at a side of the backlight unit, is illustrated in FIG. 1, a direct emitting type of the light source may also be employed for large-area LCD devices, which is uniformly arranged throughout the entire surface of the backlight unit to directly irradiate light toward the LCD panel. A diffusion plate that uniformly diffuses light emitted from the light source may be provided instead of the light guide plate.

When the light source 210 is a lamp such as a CCFL or an EEFL, it is mounted at a side of the mold frame 240. In this exemplary embodiment, one or two lamps may be mounted if necessary. When two lamps are mounted, lamps may be arranged at left and right sides or top and bottom sides of the light guide plate 220 to face each other.

A light source cover 212 is further provided at the outer surface of the light source 210, which reflects light from the light source 210 to the light guide plate 220 and covers the light source 210. Referring to FIGS. 1 and 2, one side of the light source cover 212 is opened towards the light guide plate 220 to cover the outer surface of the light source 210 except for the outer surface of the light source 210 positioned facing the light guide plate 220. The light source cover 212 is spaced apart from the light source 210 by a constant distance, and a reflection film (not shown) is formed on an inner surface of the light source cover 212.

The reflection film may be formed by coating a reflection material or adding a sheet with a reflective property on the inner surface of the light source cover 212. Further, a reflection sheet 250 may be used as the reflection film by bending an end portion of the reflection sheet 250 in the shape of the light source cover 212.

The light guide plate 220 is positioned adjacent to the light source 210. The light guide plate 220 guides light from the light source 210 to the LCD panel 100. Referring to FIG. 1, when the light source 210 is positioned at a side of the backlight unit 200, the light guide plate 220 guides light from the light source to the LCD panel 100. However, the light guide plate 220 may be omitted when a direct-type backlight unit is used. Accordingly, a diffusion plate may be used without a light guide plate.

The reflection sheet 250 may be positioned at a lower portion of the light guide plate 220. The reflection sheet 250 reflects light from the lower portion of the light guide plate 220 toward the LCD panel 100. Therefore, unused light may be recycled, thereby improving the usage efficiency of light.

Referring to FIG. 1, the optical sheets 230 include a plurality of sheets including a diffusion sheet 232, a prism sheet 234, and a protection sheet 236. Any appropriate combination of one, two or three of the sheets may be used.

The diffusion sheet 232 disperses and uniformly diffuses light from the light guide plate 220. The diffusion sheet 232 may be configured such that a diffusion member is dispersed inside a transparent sheet or a diffusion pattern is formed on the surface of a transparent sheet in order to diffuse light.

The prism sheet 234 collects light diffused by the diffusion sheet 232 to improve brightness. The prism sheet 234 may have a light-collection pattern formed on the surface of a transparent sheet.

The protection sheet 236 positioned above the diffusion and prism sheets 232, 234 prevents contamination and damage to the prism sheet 234 or the diffusion sheet 232 from dust or scratches, and prevents movement of other sheets.

Each of the optical sheets 230 further includes an extension 260. In this exemplary embodiment, the diffusion sheet 232, the prism sheet 234, the protection sheet 236, and the reflection sheet 250 may include the extension 260. The diffusion sheet 232 is described below as including the extension 260 by way of example.

Figure 4:
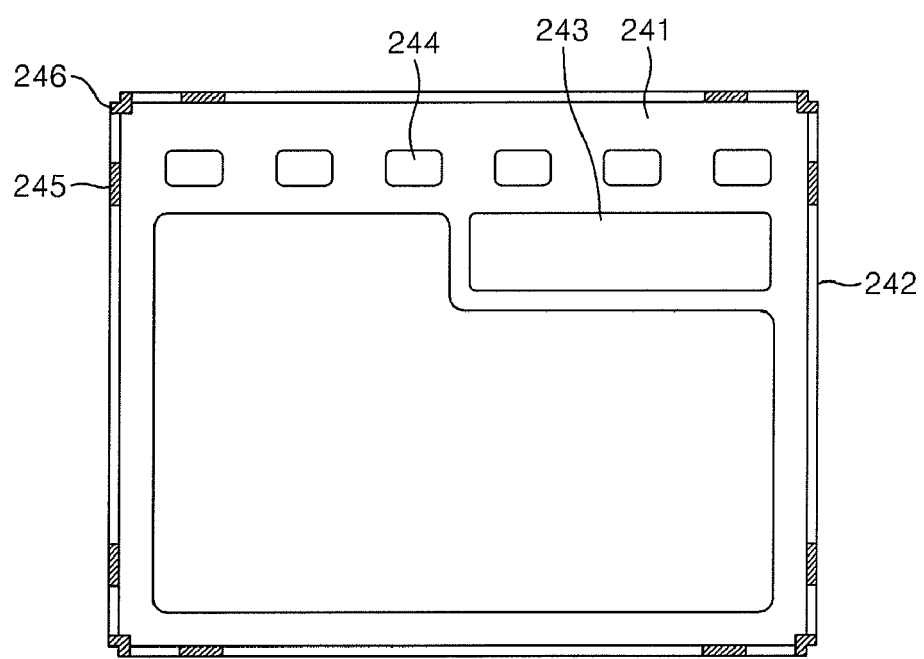
FIG. 4 is a plan view of a receiving member in accordance with an exemplary embodiment of the present invention.
Figure 5:
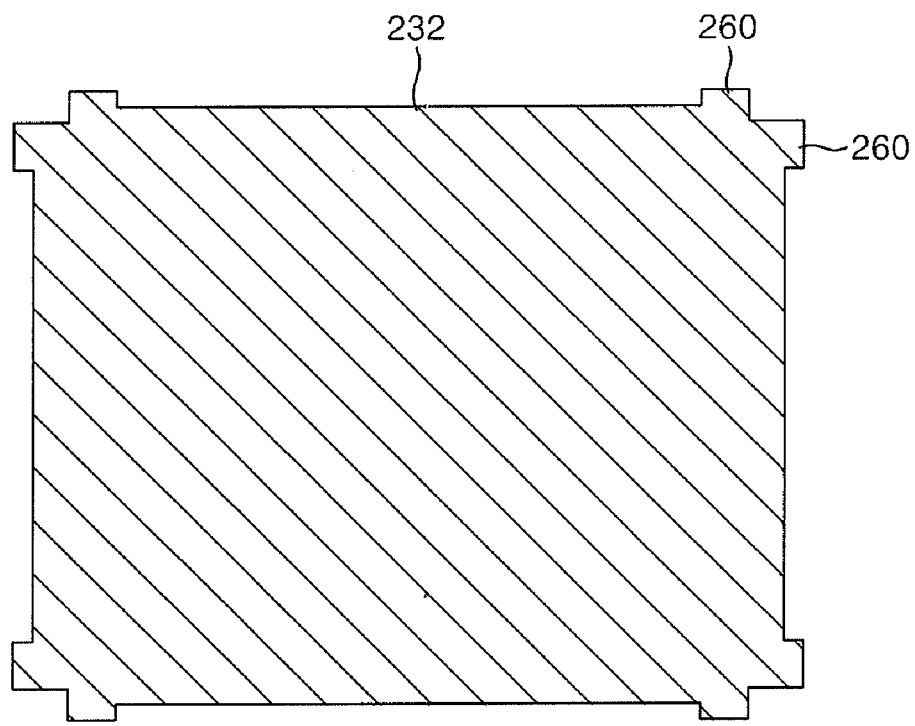
FIG. 5 is a plan view of an optical sheet in accordance with an exemplary embodiment of the present invention.

Referring to FIG. 2, the extensions 260 protrude at the edge of the diffusion sheet 232 to define the location of the diffusion sheet 232 within the backlight unit 200. The extensions 260 may be formed on either of transverse and longitudinal sides as shown in FIG. 2, or formed on both transverse and longitudinal sides as shown in FIGS. 4 and 5.

Two or more extensions 260 may extend from an edge of the diffusion sheet 232. In this embodiment, the inner surfaces 262 of two extensions 260 that are provided at the same edge come in tight contact with the receiving member (e.g., mold frame 240), so that the location of the receiving member is defined.

The extension 260 is positioned at or adjacent a corner of the diffusion sheet 232 extends from the edge of the diffusion sheet 232.

According to an exemplary embodiment of the present invention, the inner surface 262 of the extension 260 intersects the edge of the diffusion sheet 232. The inner surface 262 of the extension 260 defines the location of the diffusion sheet 232 by contacting the receiving member, and therefore, the inner surface 262 of the extension 260 is shaped to fit with the inner surface of the receiving member.

The height of the extension 260 should be the same as or smaller than the thickness/height of the sidewall 242 of the receiving member. When the height of the extension 260 is larger than the thickness/height of the sidewall 242 of the mold frame 240, the size of the backlight unit 200 increases.

As shown in FIG. 1, the light source 210, the light guide plate 220, the reflection sheet 250, and the optical sheets 230 are received in the receiving member such as the mold frame 240 or a bottom chassis. The mold frame 240 is described below as an example of the receiving member.

The mold frame 240 receives the light source 210, the light guide plate 220, the reflection sheet 250, the optical sheets 230, and the LCD panel 100. A printed circuit board 330 mounted on the LCD panel 100 is bent to contact the rear surface of the mold frame 240. The mold frame 240 includes a supporting surface 241, a sidewall 242, a printed circuit board insertion hole 243, and a data driving circuit insertion groove 244 so as to receive all the elements described above.

The backlight unit 200 may include either the mold frame 240 or a bottom chassis, or both the mold frame 240 and the bottom chassis. Although the receiving member using the mold frame 240 is illustrated in FIG. 1, the receiving member may be a bottom chassis or a combination of mold the frame and the bottom chassis.

The mold frame 240 according to this embodiment comprises the supporting surface 241 supporting the bottom surface of the diffusion sheet 232 and the sidewall 242 supporting a side surface of the diffusion sheet 232. Accordingly, the sidewall 242 is substantially perpendicular to the supporting surface 241 and has the height sufficient to receive the light guide plate 220, the optical sheets 230, and the LCD panel 100.

Returning to FIG. 1, the mold frame 240 further includes an inner surface position defining portion, which is formed at a sidewall 242 thereof, faces the inner surface 262 of the extension 260, and secures the extension 260. Since the inner surface position defining portion corresponds to the extension 260 of the diffusion sheet 232, the number of inner surface position defining portions is the same as that of the extensions 260.

In this embodiment, the inner surface position defining portion may be implemented in two ways.

Figure 3:
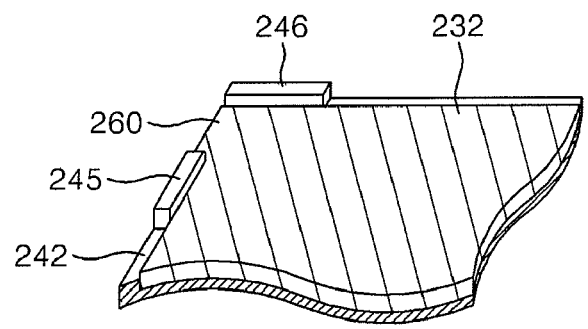
FIG. 3 is a partially enlarged view of a structure for assembling the optical sheet and the receiving member in accordance with an exemplary embodiment of the present invention.

Referring to FIGS. 2 and 3, the inner surface position defining portion may include a fastening protrusion portion 245 that upwardly protrudes from the sidewall 242 of the mold frame 240 and faces the inner surface 262 of the extension 260. The fastening protrusion portion 245 upwardly protrudes higher than the sidewall of the mold frame 240, and the side surface of the fastening protrusion portion 245 is substantially perpendicular to a top surface of the sidewall 242 of the mold frame 240 and tightly contacts the inner surface 262 of the extension 260.

Since the fastening protrusion portion 245 defines the location of the diffusion sheet 232 by contacting the extension 260, the fastening protrusion portion 245 should be positioned to tightly contact the inner surface 262 of the extension 260. In other words, as shown in FIG. 2, the distance d2 between the fastening protrusion portion 245 and the inner surface 262 should be zero or almost zero. The diffusion sheet 232 may move within the backlight unit 200 by the distance d2. Accordingly, as the distance d2 decreases, a moving range of the diffusion sheet 232 within the backlight unit 200 also decreases.

The distance d2 should be determined with reference to properties of an optical sheet 230 when the backlight unit 200 maintains a sufficiently low temperature. An optical sheet 230 expands or shrinks depending upon a temperature variation. Accordingly, the distance d2 should be determined based on a sufficiently low temperature considering all temperature environments under which the LCD device operates so that the fastening protrusion portion 245 and the inner surface 262 of the extension 260 may come in tight contact with each other. When the distance between the fastening protrusion portions 245 and the extensions 260 is too large, the optical sheet 230 may be deformed within the backlight unit 200 because there was not sufficient allowance for a shrinkage amount of the optical sheet 230 due to a temperature drop.

Figure 6:
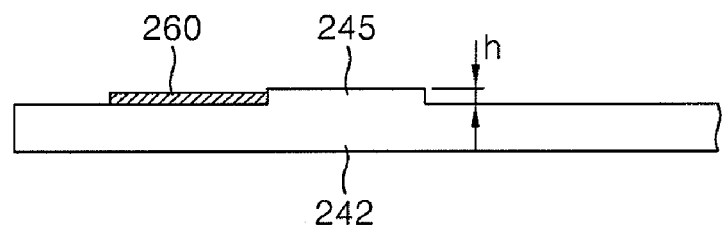
FIG. 6 is a partial side view of a receiving member in accordance with an exemplary embodiment of the present invention.

Referring to FIGS. 2 and 3, an outer surface position defining portion 246 may be further provided at a corner portion of the mold frame 240. The outer surface position defining portion 246 faces the fastening protrusion portion 245. In this embodiment, the distance between the outer surface position defining portion 246 and the extension 260 (d1) is longer than that between the inner surface position defining portion and the extension 260 (d2). The outer surface position defining portion 246 prevents the movement of the optical sheet 230 after an expansion of the optical sheet 230, and therefore, the distance d1 is larger than the distance d2. The inner surface position defining portion defines the location of the optical sheet 230 while engaged with the extension 260 of the optical sheet 230, and therefore, the distance d2 is smaller than the distance d1. The outer surface position defining portion 246 may be omitted as shown in FIG. 6.

Figure 8:
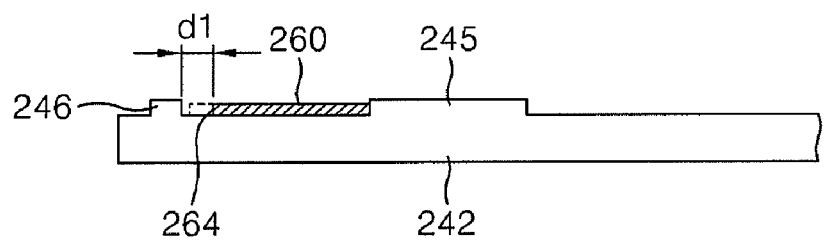
FIG. 8 is a partial side view showing expansion of an optical sheet within a receiving member in accordance with an exemplary embodiment of the present invention.

The outer surface position defining portion 246 should be sufficiently spaced apart from the outer surface 264 of the extension 260. Referring to FIG. 8, the distance d1 between the outer surface position defining portion 246 and the outer surface 264 of the extension 260 is set up for an allowance by which the optical sheet 230 may expand depending upon a temperature variation of the diffusion sheet 232. In this exemplary embodiment of the present invention, a ratio of the distance d1 between the outer surface of the extension 260 and the outer surface position defining portion to the distance d2 between the inner surface of the extension 260 and the inner surface position defining portion ranges from 3:1 to 6:1, and is preferably 5:1.

The height/thickness of the fastening protrusion portion 245 and the outer surface position defining portion 246 is the same as or larger than the height/thickness of the diffusion sheet 232. Since the extension 260 having the same thickness as that of the diffusion sheet 232 defines the location of the diffusion sheet 232 by being secured by the fastening protrusion portion 245, the fastening protrusion portion 245 protrudes beyond the thickness of the extension 260, so that the extension 260 is secured by bordering the fastening protrusion portion 245. As the thickness of an LCD device is reduced, the height of the fastening protrusion portion 245 may also be reduced. Accordingly, the height of the fastening protrusion portion 245 may be reduced to be substantially the same as that of the extension 260 so as to obtain a height to sufficiently secure the extension 260 as well as minimize the thickness of the mold frame 240.

Figure 7:
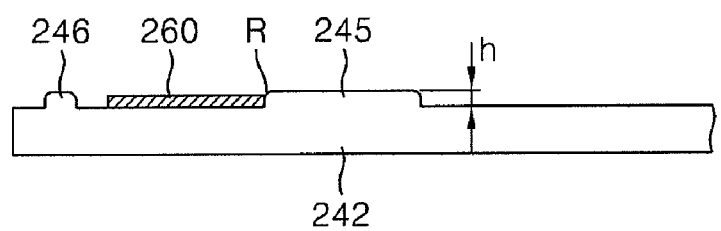
FIG. 7 is a partial side view of a receiving member in accordance with an exemplary embodiment of the present invention.

Referring to FIG. 7, the upper edge of the fastening protrusion portion 245 may have a curved shape (R). In mounting the diffusion sheet 232 to the mold frame 240, the extension 260 is inserted adjacent the fastening protrusion portion 245 while the diffusion sheet 232 descends from an upper side to a lower side of the mold frame 240. Therefore, when the upper edge of the fastening protrusion portion 245 has a curved shape, the mounting process may be facilitated. In addition the upper edge of the outer surface position defining portion 246 can also be curved to facilitate mounting of an optical sheet.

In this embodiment, the location of the diffusion sheet 232 is defined by closely contacting the inner surface 262 of the extension 260 with the fastening protrusion portion 245, and the distance between the outer surface 264 of the extension 260 and the outer surface position defining portion 246 is large enough to accommodate for deformation caused by an expansion of the diffusion sheet 232. Therefore, it is possible to sufficiently allow for deformation of the diffusion sheet 232 due to heat as well as tightly secure the diffusion sheet 232 within the backlight unit 200.

Figure 9:
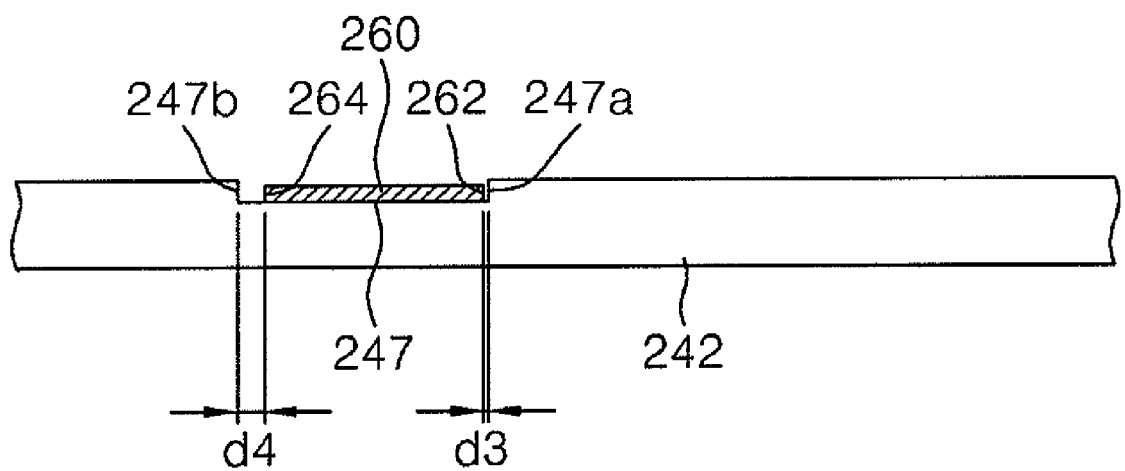
FIG. 9 is a partial side view of a receiving member in accordance with an exemplary embodiment of the present invention.

Referring to FIG. 9, the inner surface position defining portion may be formed as a fastening groove 247 for receiving and securing the extension 260 therein. As shown in FIG. 9, the fastening groove 247 is a recessed portion of the sidewall 242 of the mold frame 240, so that its inner surface 247a comes in tight contact with the inner surface 262 of the location defining portion. The height of the fastening groove 247 is lower than the rest of the sidewall 242 of the mold frame 242 in order to receive the extension 260.

The inner surface 247a of the fastening groove 247 may directly contact or be spaced from the inner surface 262 of the location defining portion by a minimum distance d3. The location of the diffusion sheet 232 within the backlight unit 200 is defined by the distance $d_3$ between the inner surface 247a of the fastening groove 247 and the inner surface 262 of the extension 260. The inner surface 262 of the extension 260 and the inner surface 247a of the fastening groove 247 come in tight contact with each other so as to prevent the movement of the diffusion sheet 232.

The outer surface 247b of the fastening groove 247 should be sufficiently spaced apart from the outer surface 264 of the extension 260. The distance $d_4$ between the outer surface 247b of the fastening groove 247 and the outer surface 264 of the extension 260 is an allowance for accepting deformation of the diffusion sheet 232 due to heat, and therefore, the distance $d_4$ should be determined in order to prevent the diffusion sheet 232 from wrinkling by the expansion of the diffusion sheet 232.

The backlight unit 200 and the LCD panel 100 are received in the mold frame 240, and then the top chassis 400 is mounted thereon to tightly secure outer surfaces of the LCD panel 100 and the mold frame 240.

A bottom chassis (not shown) may further be adhered to the rear surface of the mold frame 240, and more specifically, to the rear surface of a portion of the mold frame 240 where the light source 210 is positioned. The bottom chassis protects the light source 210, the light guide plate 220, and the like.

According to embodiments of the present invention, the location of the optical sheet may be precisely defined within the backlight unit and the deformation of the optical sheet due to heat may be sufficiently allowed for by varying the distances between inner and outer surfaces of an extension portion of an optical sheet and defining portions formed on the receiving member. In other words, the location of the optical sheet may be defined by tightly contacting the receiving member with the inner surface of the extension, and the deformation of the optical sheet caused by heat may be prevented by making the outer surface of the extension spaced sufficiently from the receiving member.

Although exemplary embodiments of the present invention have been described above, it is understood that the present invention should not be limited to these exemplary embodiments and that various changes and modifications can be made by one of ordinary skill in the art within the sprit and scope of the present invention as hereinafter claimed.

What is claimed is:

1. A backlight unit comprising:
    an optical sheet;
    a receiving member configured to receive the optical sheet, the receiving member having a supporting surface supporting the optical sheet;
    an extension protruding from a side of the optical sheet;
    an inner surface position defining portion extending from the receiving member and facing a first side of the extension, the inner surface position defining portion being substantially perpendicular to the supporting surface of the receiving member; and
    an outer surface position defining portion extending from the receiving member and disposed apart from the inner surface position defining portion, the outer surface position defining portion facing a second side of the extension and being substantially perpendicular to the supporting surface of the receiving member,
    wherein a distance between the first and second sides of the extension is a width of the extension extending parallel to the side of the optical sheet,
    wherein a first distance between the inner surface position defining portion and the first side of the extension is less than a second distance between the outer surface position defining portion and the second side of the extension, and
    wherein a ratio of the second distance to the first distance is less than or equal to 6:1.

2. The backlight unit of claim 1, wherein the ratio of the second distance to the first distance ranges from 3:1 to 6:1.

3. The backlight unit of claim 2, wherein the ratio of the second distance to the first distance is 5:1.

4. The backlight unit of claim 1, further comprising at least one other extension protruding from another side surface of the optical sheet.

5. The backlight unit of claim 4, wherein the extensions protrude from opposing sides of the optical sheet, respectively.

6. The backlight unit of claim 1, wherein the inner surface position defining portion is a protrusion portion protruding upwardly from a surface of a side of the receiving member.

7. The backlight unit of claim 6, wherein a surface of the protrusion portion contacts the first side of the extension.

8. The backlight unit of claim 1, wherein the optical sheet comprises at least one of a diffusion sheet, a prism sheet, a protection sheet, and a reflection sheet.

9. The backlight unit of claim 1, wherein the receiving member comprises at least one of a mold frame and a bottom chassis.

10. The backlight unit of claim 1, wherein the extension is disposed between the inner surface position defining portion and the outer surface position defining portion.

11. The backlight unit of claim 1, wherein the second side of the extension moves closer to the outer surface position defining portion when the optical sheet expands due to heat.

12. A liquid crystal display comprising:
    a liquid crystal display panel configured to display an image; and
    a backlight unit configured to supply light to the liquid crystal display panel,
    wherein the backlight unit comprises,
    an optical sheet;
    a receiving member configured to receive the optical sheet, the receiving member having a supporting surface supporting the optical sheet;
    a first extension protruding from a first side of the optical sheet in a first direction;
    a second extension protruding from a second side of the optical sheet in a second direction different from the first direction;
    first and second inner surface position defining portions extending from the receiving member, being substantially perpendicular to the supporting surface of the receiving member, and facing first sides of the first and second extensions, respectively; and
    first and second outer surface position defining portions extending from the receiving member and disposed apart from the first and second inner surface position defining portions, respectively, being substantially perpendicular to the supporting surface of the receiving member, and facing second sides of the first and second extensions, respectively,
    wherein distances between the first and second sides of each of the first and second extensions are respective widths of the first and second extensions extending parallel to respective first and second sides of the optical sheet, and
    wherein a ratio of a second distance between the second sides of the first and second extensions and the first and second outer surface position defining portions to a first distance between the first sides of the first and second extensions and the first and second inner surface position defining portions is less than or equal to 6:1.

13. The liquid crystal display of claim 12, wherein the ratio of the second distance to the first distance ranges from 3:1 to 6:1.

14. The liquid crystal display of claim 13, wherein a ratio of the second distance to the first distance is 5:1.

15. The liquid crystal display of claim 12, wherein at least two extensions protrude in the first direction and at least two extensions protrude in the second direction.

16. The liquid crystal display of claim 12, wherein the first and second inner surface position defining portions are protrusion portions protruding upwardly from a surface of a side of the receiving member.

17. The liquid crystal display of claim 16, wherein a surface of each of the protrusion portions contacts the first sides of the first and second extensions, respectively.

18. The liquid crystal display of claim 12, wherein the optical sheet comprises at least one of a diffusion sheet, a prism sheet, a protection sheet, and a reflection sheet.

19. The liquid crystal display of claim 12, wherein the receiving member comprises at least one of a mold frame and a bottom chassis.

* * * * *